(12) United States Patent
Joret et al.

(10) Patent No.: US 9,593,644 B2
(45) Date of Patent: Mar. 14, 2017

(54) CONTROL DEVICE FOR A TURBOJET ENGINE THRUST REVERSER, BLOCKING THE REVERSER

(71) Applicant: AIRCELLE, Gonfreville l'Orcher (FR)

(72) Inventors: Jean-Philippe Joret, Beuzeville (FR); Pascal Soulier, Le Havre (FR); Vincent Taddei, Boulleville (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 14/975,326

(22) Filed: Dec. 18, 2015

(65) Prior Publication Data

US 2016/0102633 A1    Apr. 14, 2016

Related U.S. Application Data

(63) Continuation of application No. PCT/FR2014/051548, filed on Jun. 20, 2014.

(30) Foreign Application Priority Data

Jun. 21, 2013   (FR) ..................... 13 55945

(51) Int. Cl.
*F02K 1/76*    (2006.01)
*F02K 1/72*    (2006.01)
*F02K 1/62*    (2006.01)

(52) U.S. Cl.
CPC .............. *F02K 1/766* (2013.01); *F02K 1/625* (2013.01); *F02K 1/72* (2013.01); *F02K 1/76* (2013.01); *F02K 1/763* (2013.01); *F05D 2260/84* (2013.01)

(58) Field of Classification Search
CPC ... F02K 1/625; F02K 1/72; F02K 1/76; F02K 1/763; F02K 1/766
See application file for complete search history.

(56) References Cited

U.S. PATENT DOCUMENTS

| 5,720,449 A | 2/1998 | Laboure et al. |
| 5,826,823 A | 10/1998 | Lymons et al. |
| 2004/0139724 A1* | 7/2004 | Colotte ................... F02K 1/766 60/226.2 |

FOREIGN PATENT DOCUMENTS

| EP | 0 524 875 A1 | 1/1993 |
| FR | 2 960 918 | 12/2011 |
| WO | 01/57382 A2 | 8/2001 |
| WO | 2008/142243 A1 | 11/2008 |

OTHER PUBLICATIONS

International Search Report issued Jul. 30, 2014 in International Application No. PCT/FR2014/051548.

* cited by examiner

*Primary Examiner* — Gerald L Sung
*Assistant Examiner* — Scott Walthour
(74) *Attorney, Agent, or Firm* — Burris Law, PLLC

(57) ABSTRACT

A control device for a thrust reverser of a turbojet engine nacelle, which includes movable portions actuated by actuators, includes: a first blocking control acting on a motor-actuated system; and a second blocking control acting, mechanically, on the movable portions. The second blocking control may inhibit, when activated, a deployment of the movable portions. The control device further includes a device inhibiting disengagement of the first blocking control when a mechanical control is activated.

9 Claims, 4 Drawing Sheets

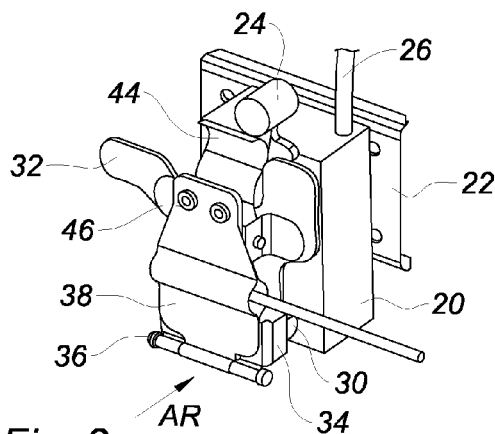 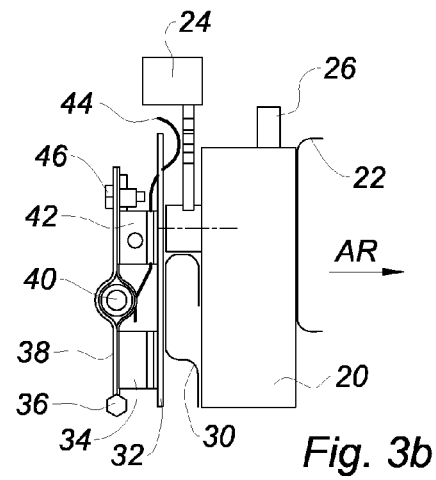
Fig. 3a  Fig. 3b
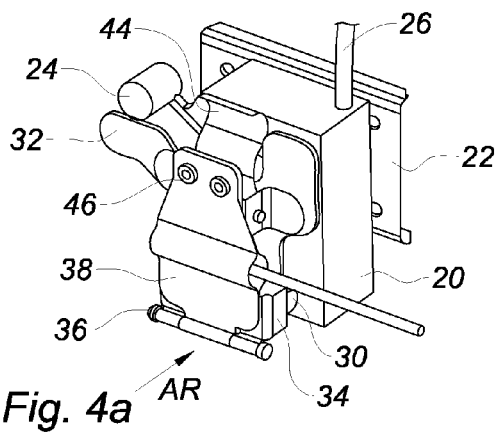 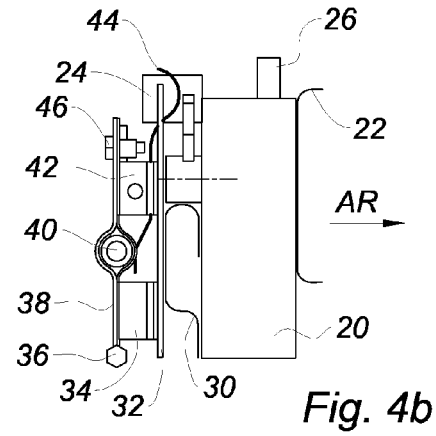
Fig. 4a  Fig. 4b
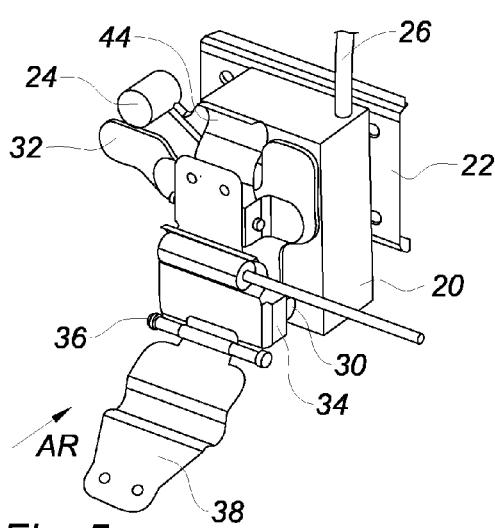 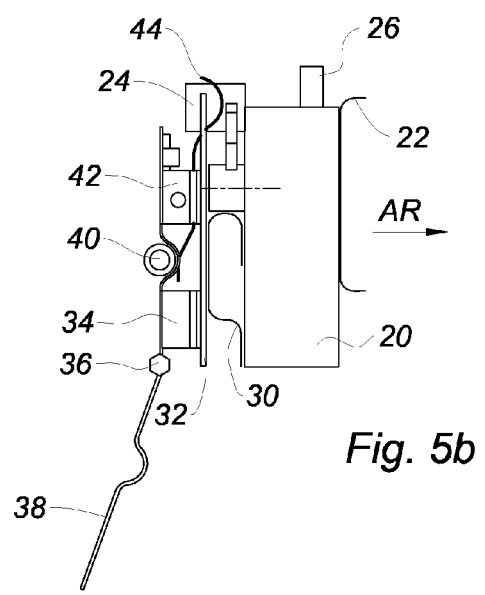
Fig. 5a  Fig. 5b

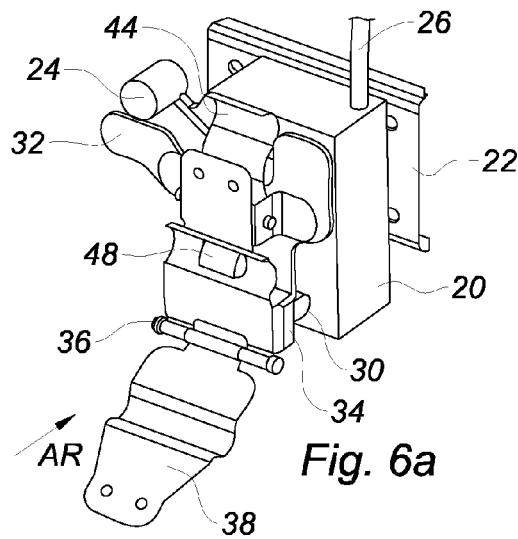
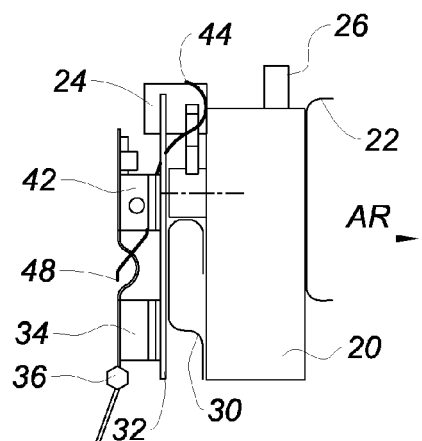
Fig. 6a
Fig. 6b
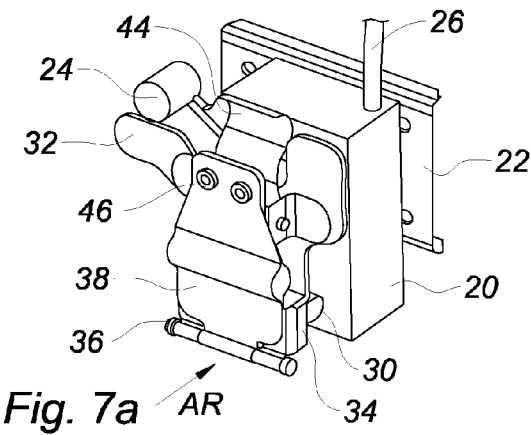
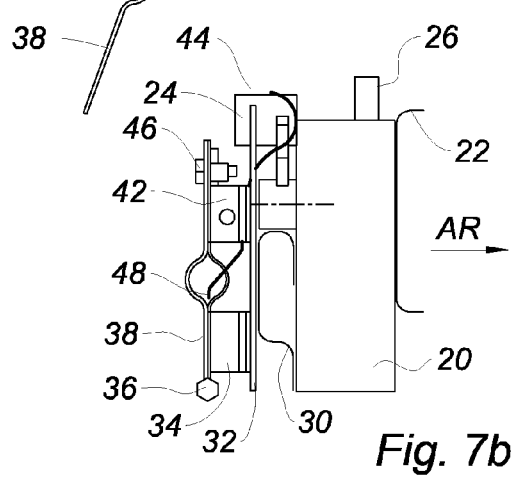
Fig. 7a
Fig. 7b
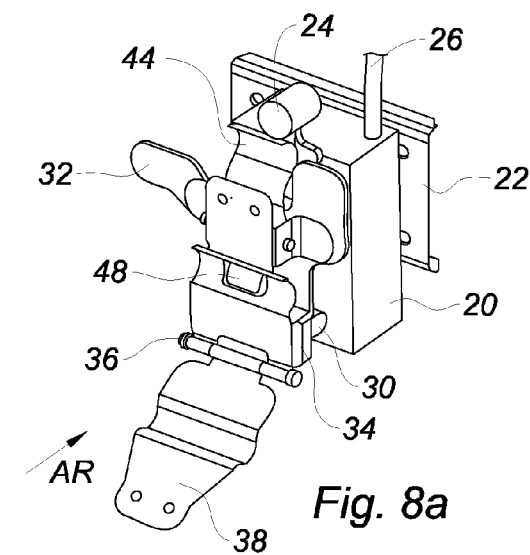
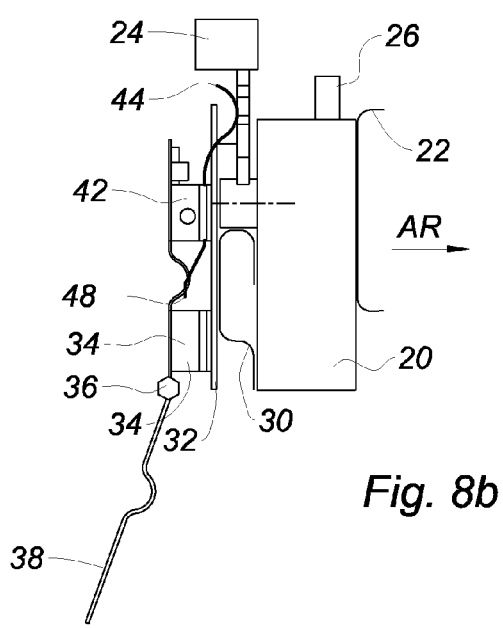
Fig. 8a
Fig. 8b

CONTROL DEVICE FOR A TURBOJET ENGINE THRUST REVERSER, BLOCKING THE REVERSER

CROSS-REFERENCE TO RELATED APPLICATIONS

This application is a continuation of International Application No. PCT/FR2014/051548, filed on Jun. 20, 2014, which claims the benefit of FR 13/55945, filed on Jun. 21, 2013. The disclosures of the above applications are incorporated herein by reference.

FIELD

The present disclosure relates to a control device which allows deactivating a thrust reverser of an aircraft nacelle, as well as an aircraft nacelle equipped with such a control device.

BACKGROUND

The statements in this section merely provide background information related to the present disclosure and may not constitute prior art.

Propulsion units for aircrafts generally include a nacelle forming an external envelope which is generally circular and which comprises, inside, a turbojet engine disposed along the longitudinal axis of this nacelle.

The turbojet engine receives fresh air coming from the upstream or front side, and discharges at the downstream or rear side the hot gases which result from the combustion of fuel and which deliver a certain thrust. In bypass turbojet engines, fan blades which are disposed around this turbojet engine generate a significant secondary cold air flow which is conveyed along an annular flow path extending between the engine and the nacelle, thereby adding a high thrust.

Some nacelles include a thrust reverser system which closes, at least in part, the annular cold air flow path, and which discharges the secondary flow forward in order to generate a backward thrust for braking the aircraft.

A known type of thrust reversers, presented in particular in Document FR-2960918 A1, includes two movable half-portions which form rear cowls and which can slide axially backward under the action of cylinders, thereby deploying flaps in the annular flow path in order to close this flow path, at least in part, and redirect the cold air flow radially outward through cascades which are uncovered during this sliding and which comprise blades which direct this flow forward.

Another known type of thrust reversers, presented in particular in Document WO-2008/142243 A1, includes the rear of the nacelle doors which are actuated by cylinders and which tilt in order to close the annular flow path, at least in part, thereby deflecting the cold flow radially outward, these doors then direct the flow forward so as to generate the braking thrust.

Moreover, in order to carry out maintenance operations, or to disable the thrust reverser, for example in the event of a failure, it is known to dispose a first manual control on the nacelle, which control acts, when activated, on the motor-actuated system which may be hydraulic, electric or pneumatic, in order to prevent deployment of this thrust reverser. For the same purpose, it is also known to dispose a second manual blocking control, which control acts when mechanically activated and which comprises, for example, an axle connected to the control by means of a rod, which is introduced between the rail and the guide glider of the movable portions of a cascade-type thrust reverser, in order to prevent any displacement of these portions.

The two controls of the motor-actuated and mechanical system are independent of each other, an operator being capable of activating either one of these controls, or both, in order to prevent the deployment of the thrust reverser.

SUMMARY

The present disclosure provides a control device for a thrust reverser of a turbojet engine nacelle comprising movable portions actuated by actuators, which deploy so as to reverse the thrust, this device including a first blocking control acting on the motor-actuated system as well as a second blocking control acting, mechanically, on the movable portions, which controls inhibit, when activated, the deployment of these movable portions, the device being characterized in that it includes a means which inhibits the disengagement of the first control, in the case where the mechanical control is activated.

An advantage of this control device is that it allows inhibiting any faulty maneuver, in a simple and effective manner and with low-cost means, by inhibiting the operator from disengaging the first control as long as the mechanical control is not disengaged, thereby reducing the risk of letting the aircraft leave with a non-operational thrust reverser.

In addition, the control device according to the present disclosure may include one or several of the following features, which may be combined together.

Advantageously, the means, which inhibits the disengagement, directly blocks the displacement of an operating lever of the first control, so as to achieve this inhibition in a simple manner.

The operating lever can pivot, the means being thereby brought in the pivot plane of this lever.

In particular, the mechanical blocking control may include clamping of an end piece of a rod in a corresponding form. Thus, an existing mechanical blocking control is used.

Advantageously, when the end piece is not in the corresponding form, a space is freed which space enables a tab to be displaced, this tab inhibiting the disengagement of the first control. This mechanical system is simple and effective.

In particular, the end piece may have a cylindrical-shaped form clamped between two supports, the corresponding form of one of these supports being provided with an opening intended to enable the tab to fit inside when this end piece is removed.

Advantageously, the tab is located at one end of a pivoting blocking strip, the other end of this strip comprising a means which directly inhibits the displacement of the operating lever of the first blocking control. Thus, the correlation between the activation of the mechanical control and the inhibition of the disengagement of the first control is directly achieved by the means of one single part.

Complementarily, the control device may include a second device which inhibits any activation of the second control before the activation of the first control. Thus, an order is imposed on the activation of the two controls.

In particular, the first blocking control may include an operating lever comprising a finger constituting the second device, which comes in front of a movable support maintaining the second control disengaged.

The present disclosure also relates to a nacelle for a turbojet engine including a thrust reverser provided with movable portions actuated by actuators, which deploy so as to reverse the thrust, and a control device comprising a first blocking control acting on the motor-actuated system as well as a second blocking control acting, mechanically, on the movable elements, characterized in that this control device is includes any one of the preceding features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 3a and 3b are, respectively, perspective and side views of a control device according to the present disclosure, both controls being disengaged;

FIGS. 4a and 4b are views of this device, the first blocking control being activated;

FIGS. 5a and 5b are views of this device, the mechanical control being held open;

FIGS. 6a and 6b are views of this device, the mechanical control being activated;

FIGS. 7a and 7b are views of this device, the mechanical control being held closed, this mechanical control remaining activated;

FIGS. 8a and 8b are views of the control device, the first blocking control being disengaged and the mechanical control being activated;

Figure 1:
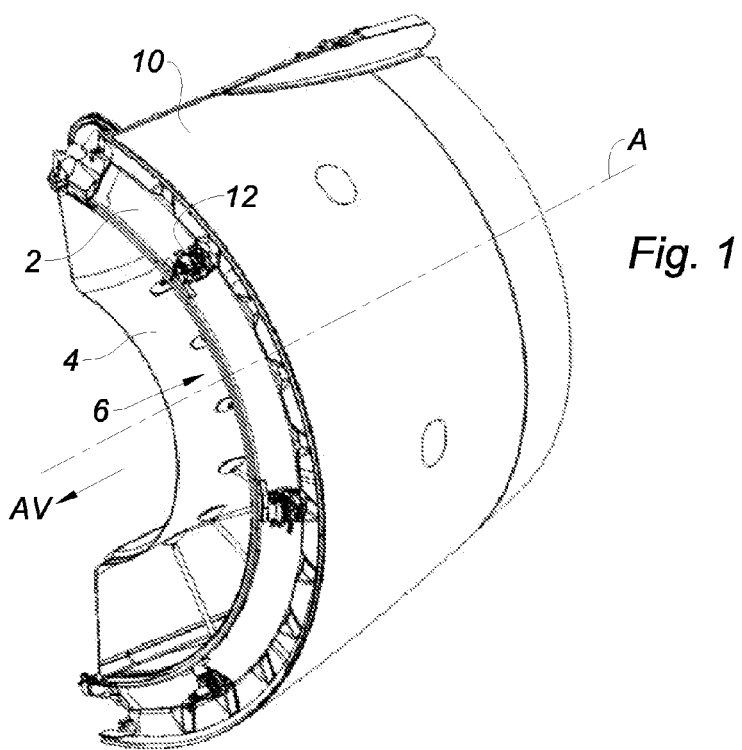
FIG. 1 is a half-side view of a cascade-type thrust reverser, the thrust reverser being in a closed position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
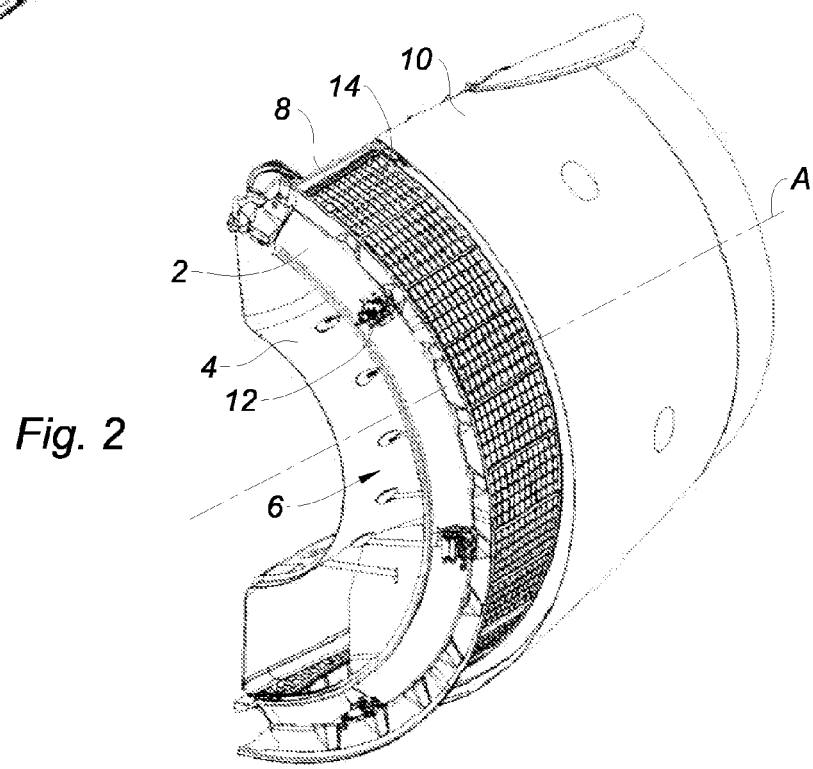
FIG. 2 is a view of this half, the thrust reverser being in a deployed position.

FIGS. 1 and 2 present the rear portion of a turbojet engine nacelle centered around a main axis A, comprising a front frame 2 fastened on the front side structure, which structure is not represented. The secondary annular flow path 6 is located between the inner wall of the rear portion, and the fixed internal structure 4.

The rear portion of the nacelle is covered with two movable cowls 10, each forming a half-circle, when viewed in a cross-sectional plane. Each cowl 10 is axially guided by longitudinal guide rails 8, which enable backward sliding under the action of cylinders 12 which may be electric, hydraulic or pneumatic, and the front end of which is fastened on the front frame 2.

When sliding backward, each cowl 10 deploys its flaps in the annular flow path 6 in order to partially close this passage, and to redirect the air flow radially outward through deflection cascades 14 which guide this air flow forward in order to brake the aircraft.

In order to provide safer maintenance operations, or to inhibit the operation of the thrust reverser, for example in the event of a failure, the nacelle includes a control device intended to block the thrust reverser, which device comprises a first manual control which acts on the motor-actuated system intended to actuate the cowls 10, and a second control which, mechanically, acts directly on the guiding of these cowls, in order to inhibit the backward displacement of the cowls.

In particular, it is possible to dispose a steel-made axle which is accommodated between a guide rail 8 and the corresponding glider of the cowl 10, so as to inhibit this cowl from sliding backward.

The following FIGS. 3 to 7 present a control device as it is maneuvered by an operator in five consecutive positions, which device comprises a first control and a mechanical control intended to block a thrust reverser.

The control device includes an enclosure 20 which is held flat by a metal sheet 22 disposed on one side of this enclosure, which side is so-called the rear side and indicated by an arrow noted <<AR>>, on a fixed element of the structure of the nacelle, at a location which is easily accessible by an operator.

A first control lever 24, disposed in front of the enclosure 20 and comprising a cylindrical handling grip which protrudes above this enclosure, tilts along a horizontal axis perpendicular to the enclosure so as to activate this control, as is presented in FIGS. 4 to 7, by transmitting a command, via a connection 26, thereby blocking the operation of the cylinders 12 which displace the cowls 10.

A sheet metal connecting element 30, which is fastened on the front face of the enclosure 20 below the lever 24, forms a loop which receives a second mechanical control located to the front of this lever.

A marking carrier 32 fastened in front of the connecting element 30 forms a planar sheet of metal parallel to the front face of the enclosure, comprising in its upper portion two indications, spaced apart laterally and corresponding to the two positions of the lever 24 of the first blocking control.

A fixed support 34 which is fastened in the lower portion of the marking carrier 32, is formed in a folded sheet of metal including an upper portion forming a vertical plan which extends upward above the pivot axis of the lever 24. The lower portion of the fixed support 34 comprises a hinge provided with a horizontal axis 36, which receives a movable support 38 formed in a sheet of metal which may fit flat on this fixed support.

Each of the two fixed 34 and movable 38 supports includes, at an intermediate level, a recess which forms a horizontal half cylinder turned toward each other, so as to form a central cylindrical clearance between the two sheets of metal, the axis of which cylindrical clearance is parallel to the hinge 36.

The upper portions of the two fixed 34 and movable 38 supports may be clamped on each other by two screws 46, in order to clamp a cylindrical end piece 40 in the central cylindrical clearance, which end piece is located at the end of a rod which is mechanically connected to a blocking device thereby inhibiting sliding of the immobile portions of the thrust reverser.

By removing the two screws 46 and by tilting the movable support 38 forward, as is presented in FIGS. 5 and 6, the mechanical control is activated by releasing the cylindrical end piece 40 which enables its rod to be displaced and mechanically block the thrust reverser.

The fixed support 34 includes, in an intermediate portion between the clamping screws 46 and the cylindrical recess which receives the end piece 40, a means intended to guide a blocking strip 44, which means enables this strip to pivot about a horizontal axis located in the plane of this support.

The blocking strip 44 includes a lower tab 48 which is adjusted in a central cut of the cylindrical recess of the fixed support 32, so as to bear on the end piece 40 when the latter is there, as is presented in FIGS. 3, 4 and 5. In this position, the blocking strip 44 includes, at its upper end, a curve which is located sufficiently forward for enabling the control lever 24 to freely tilt backward, in order to maneuver it so as to activate or disengage the first control.

When the movable support 38 is detached and the end piece 40 removed, under the action of a spring, the lower tab 48 of the blocking strip 44 is displaced forward by pivoting of this strip, and fits in the cut of the cylindrical recess of the fixed support 34. The upper curve of the blocking strip 44 is displaced backward by the action of its spring, and bears on the lever 24 if the latter faces this curve, in the disengaged position of the first control.

In the case where the first blocking control is in an activated position, as is presented in FIGS. 6 and 7, the lever 24 is shifted relative to the upper curve of the blocking strip 44. By the action of its spring, the blocking strip 44 tilts backward and sets its upper curve in the plane of the lever 24, this lever can no longer return to a disengaged position.

FIGS. 3a and 3b present the control device as the first blocking control and the mechanical blocking control have been disengaged, the lever 24 has been tilted to the right, and the cylindrical end piece 40 is held between the supports 34, 38. The thrust reverser can operate freely.

FIGS. 4a and 4b present the control device as the first blocking control is activated, the operator has tilted the lever 24 to the left, so it does no longer face the upper curve of the blocking strip 44. However, the operator is still free to disengage this first control, by tilting the lever 24 back to the right.

FIGS. 5a and 5b present the control device as the movable support 38 has been detached from the fixed support 34, the operator having removed the screws 46, and then tilted this movable support forward. Afterwards, the cylindrical end piece 40 is withdrawn from its room as is presented in FIGS. 6a and 6b, the lower tab 48 of the blocking strip 44 having taken the place of this end piece. The mechanical blocking control is activated.

It should be noted that the operator cannot disengage the first control as it is not possible to displace the lever 24 of this control back to the right because of the position of the upper curve of the blocking strip 44.

FIGS. 7a and 7b present the control device as the movable support 38 has been set back in position by the operator, while the cylindrical end piece 40 is still not positioned in its room. In this case, the mechanical control is still activated. Thus, the operator cannot disengage the first blocking control.

Thus, a safety is improved, in a simple and effective manner, for all types of thrust reverser systems, which safety inhibits the disengagement of the first blocking control as long as the mechanical blocking control is still activated. In this case, the operator cannot inadvertently reset the thrust reverser in service by activating the first control, which would not be achieved because of the mechanical blocking control which is still activated.

FIGS. 8a and 8b present the control device as the first blocking control has remained in a disengaged position, and the mechanical control has been activated by the operator who has disposed the movable support 38 and the cylindrical end piece 40.

In this case, the operator can disengage the mechanical blocking control by resetting the cylindrical end piece 40 and the movable support 38, the two controls would then be disengaged as was initially the case.

In this case, the operator can also activate the first blocking control by tilting the lever 24 to the left, thereby setting the control device in the position presented in FIGS. 6a and 6b. The device is again in the secured position where the first control cannot be disengaged without having disengaged the mechanical control beforehand.

Hence, safety is improved as the first control is inhibited from being disengaged as long as the mechanical control is activated, regardless of the order according to which either one of the controls has been activated.

Figure 9A:
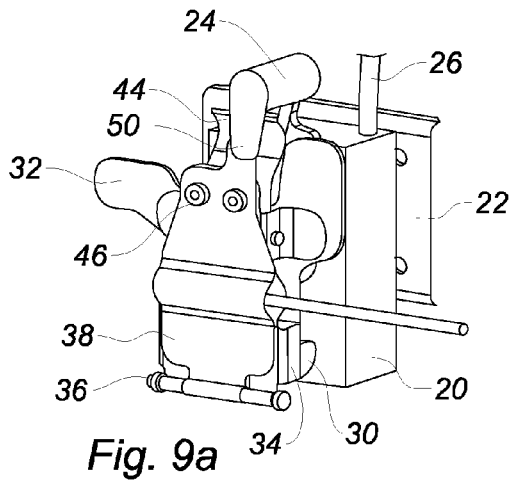
FIGS. 9a and 9b are views of a control device according to one variant, the two controls being disengaged.
Figure 9B:
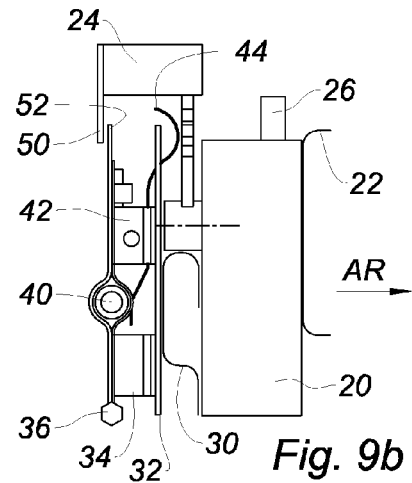

FIGS. 9a and 9b present a control device according to one variant, including a cylindrical grip provided, on its front face, with a finger 50 turned downward, which fingers comes in front of a corresponding tab 52 formed at the top of the movable support 38 when the first blocking control is disengaged with the lever 24 tilted to the right, and when the mechanical blocking control is disengaged with the movable support clamped on the fixed support.

In this position of the lever 24, the mechanical control cannot be activated, the finger 50 of this lever thereby indicates, to the operator, a inhibition of the opening of the movable support 38. It is then necessary to activate the first control before being able to activate the mechanical control.

Figure 10A:
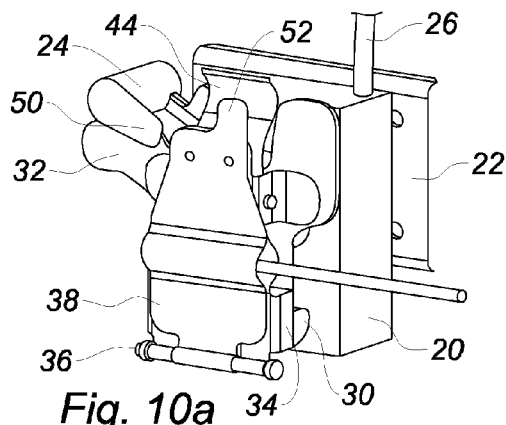
FIGS. 10a and 10b are views of this device, the first blocking control being activated.
Figure 10B:
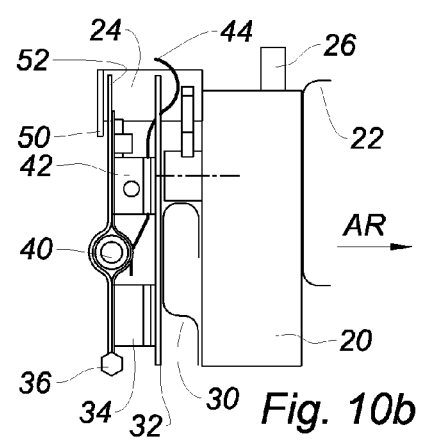

FIGS. 10a and 10b present the control device as the first blocking control has been activated, the lever 24 having been tilted to the left, its finger 50 having then freed the tab 52 from the movable support 38, thereby enabling access to this movable support 38.

Figure 11A:
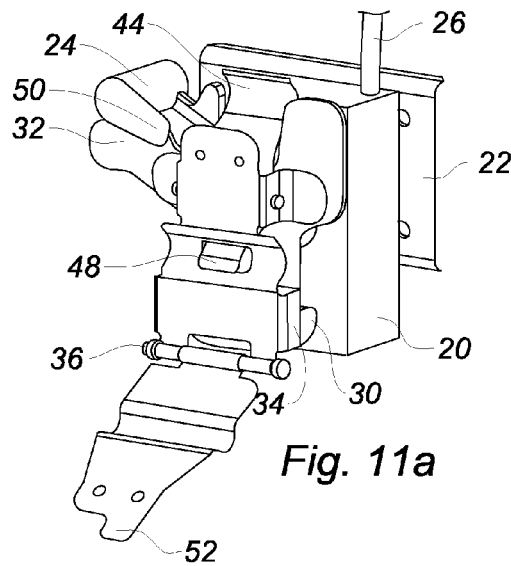
FIGS. 11a and 11b are view of this device, the first blocking control and the mechanical control being activated.
Figure 11B:
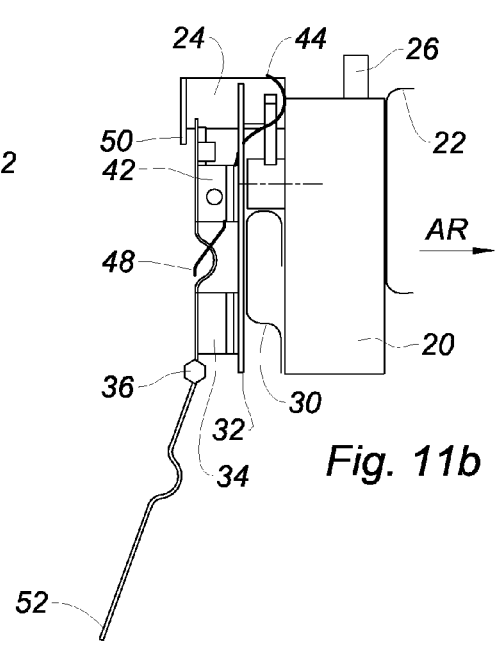

FIGS. 11a and 11b present the control device as the movable support 38 has been freely open so as to withdraw the cylindrical end piece 40, and activate the mechanical blocking control. Thus, a control device is realized, in a simple manner, which device imposes this activation order of the blocking controls.

The principle of the control device presented above, comprising a mechanical means which imposes this maneuvering order of the controls, may be generalized with a first blocking control comprising other types of motions of the grip, such as for example a translational motion. It may also be generalized with a mechanical control which activates, in various manners, one or several blocking means of the movable portions of the thrust reverser which may be realized according to different models which are known by those skilled in the art.

What is claimed is:

1. A control device for a thrust reverser of a turbojet engine nacelle comprising movable portions actuated by actuators, which movable portions deploy so as to reverse a thrust, the control device comprising:

a first blocking control acting on a motor-actuated system, the first blocking control comprising an operating lever; and a second blocking control acting, mechanically, on the movable portions, the second blocking control configured to inhibit, when activated, a deployment of the movable portions, wherein the control device comprises a member which directly blocks displacement of the operating lever of the first blocking control when the second blocking control is activated, thereby blocking deployment of the thrust reverser of the turbojet engine nacelle.

2. The control device according to claim 1, wherein as the operating lever pivots, the device is brought in a pivot plane of the operating lever.

3. The control device according to claim 1, wherein the second blocking control includes a movable support capable of clamping an end piece of a rod.

4. The control device according to claim 3, wherein when the end piece is not clamped, a tab is displaced, the tab inhibiting a disengagement of the first blocking control.

5. The control device according to claim 4, wherein the end piece has a cylindrical-shaped form clamped between the movable support and a stationary support, and wherein the stationary support is provided with an opening configured to fit the tab inside when the end piece is removed.

6. The control device according to claim 4, wherein the member is a pivoting blocking strip, and wherein the tab is located at one of the pivoting blocking strip, and another end of the pivoting blocking strip directly blocks the displacement of the operating lever of the first blocking control.

7. The control device according to claim 1, further comprising a second device configured to inhibit any activation of the second blocking control before the activation of the first blocking control.

8. The control device according to claim 7, wherein the operating lever comprises a finger constituting the second device, which comes in front of a movable support to maintain the second blocking control as disengaged.

9. A nacelle for a turbojet engine including a thrust reverser provided with movable portions actuated by actuators, which movable portions deploy so as to reverse a thrust, and the control device according to claim 1.

* * * * *